United States Patent Office 3,487,129
Patented Dec. 30, 1969

3,487,129
NOVEL CHLORINATED GRAFT COPOLYMER OF POLYVINYL CHLORIDE ONTO AN ETHYLENE POLYMER BACKBONE
Norbert Platzer, Longmeadow, Mass., assignor to Monsanto Company, St. Louis, Mo., a corporation of Delaware
No Drawing. Filed Mar. 2, 1964, Ser. No. 348,843
Int. Cl. C08f 27/03, 29/24
U.S. Cl. 260—878                                    8 Claims

ABSTRACT OF THE DISCLOSURE

A chlorinated graft copolymer blend is prepared by polymerizing a vinyl chloride monomer formulation in the presence of an elastomeric backbone of chlorinated polyethylene, polyethylene or ethylene-vinyl acetate copolymer. After polymerization, the resultant graft copolymer blend is then subjected to post-chlorination.

---

The present invention relates generally to a new and useful chlorinated polymeric material and more particularly to a novel chlorinated graft copolymer.

Chlorinated polyvinyl chloride has been recognized for many years as a compound having unusual and desirable heat stability characteristics. It has been found that several of the properties inherent in unplasticized polyvinyl chloride may be retained, and in addition, increased tolerance for high temperature, including outstanding resistance to decomposition by heat, materially increased softening temperatures and greater dimensional stability may be imparted to polyvinyl chloride by post-chlorinating the resin in any of several well known procedures. However, problems have arisen due to the brittleness of the chlorinated products and, in addition, processing difficulties have been experienced with chlorinated polyvinyl chloride due to the fact that the processing temperatures of the chlorinated products lie so close to their decomposition temperatures.

It has also been proposed to polymerize vinyl chloride in the presence of the polyethylene. The resultant graft copolymer, which is unlike either polyethylene or polyvinyl chloride, copolymers of ethylene and vinyl chloride, or even simple mixtures of polyethylene and polyvinyl chloride, has found use in numerous applications requiring the use of a transparent, colorless material having good tear and crease resistance without exhibiting "blushing." These graft copolymers, however, suffer from poor heat stability characteristics and poor mechanical properties at high temperatures. Recently, mechanical polyblends of chlorinated polyvinyl chloride and elastomers, such as nitrile rubber, have begun to find extensive use in process piping, tanks, duct-work, hot and cold water lines, valves, and many other applications for homes and industrial plants. However, the incompatibility of certain elastomer-chlorinated polyvinyl chloride ratios, together with high costs have limited their use in some respects. Blends of post-chlorinated polyvinyl chloride with chlorinated hydrocarbon polymers have also been proposed. It has been found, however, that attempts to blend these materials have met with poor success unless the hydrocarbon chain is homogeneously, or substantially homogeneously chlorinated.

No single polymeric material has been found which enjoys a desirable combination of low cost, ease of fabrication in conventional thermoplastic processing equipment, and excellent thermal stability over a wide temperature range.

It is therefore an object of this invention to provide an improved polymeric material which, together with suitable additives, provides superior rigid, semi-rigid, and flexible thermoplastic compositions for use in exacting service where to be desirable a material must combine numerous specific properties.

It is a further object of this invention to provide lower cost compositions which satisfy complex use requirements and service heretofore requiring the specification of only the more expensive rigid, semi-rigid, and flexible polymeric materials or those which are particularly difficult to fabricate into useful objects.

It is a still further object of this invention to provide a new and useful chlorinated graft copolymer of vinyl chloride and polyethylene, chlorinated polyethylene, or an ethylene-vinyl acetate copolymer.

It is a further object of this invention to provide a process for preparing a chlorinated graft copolymer of vinyl chloride and polyethylene, chlorinated polyethylene, or an ethylene-vinyl acetate copolymer.

It is a further object of this invention to provide the art with a novel composition useful in the production of pipes, containers, and structures capable of extending long distances between supports without sagging under service temperatures in the range of 125° C.

Each of the above objects has been realized through the development of a novel series of chlorinated graft copolymers composed of pendant vinyl chloride chains polymerized onto a rubbery backbone of polyethylene, an ethylene-vinyl acetate copolymer, or chlorinated polyethylene. The chlorinated graft copolymers formed in the practice of this invention are those wherein 50–99 parts by weight of a vinyl chloride monomer is graft polymerized with 1 to 50 parts by weight of polyethylene, ethylene-vinyl acetate copolymer, or a chlorinated polyethylene.

The chlorinated graft copolymer material may be prepared by first dissolving, swelling, or dispersing the finely divided backbone rubber in vinyl chloride monomer, polymerizing the vinyl chloride in solution, suspension, or emulsion using conventional free radical producing initiators and polymerization aids, and chlorinating the resultant graft copolymer blend by photochlorination, chlorination in the presence of a chlorinated solvent under conditions of high pressure and temperature, or chlorination in the presence of an acyl persulfonate initiator.

The ethylenically unsaturated monomers useful in preparing the graft polyblends are those consisting of at least 80 percent by weight of vinyl chloride with up to 20 percent of other ethylenically unsaturated monomers copolymerizable therewith, such as vinylidene chloride, vinyl esters of organic acids, acrylonitrile, acrylates, methacrylates, maleates, fumarates, ethylene, propylene, vinyl fluoride, vinyl bromide, divinyl benzene, divinyl phthalate, diallyl maleate, and other unsaturated organic compounds. The ethylene-vinyl acetate copolymers employed in the practice of the invention consist essentially of 15–85 percent by weight of combined ethylene and 85–15 percent by weight of combined vinyl acetate. These copolymers, which can be prepared by any conventional technique, should have average molecular weights of 15,000 to 500,000, and more preferably from 50,000 to 200,000.

The rubbery backbone, as mentioned previously, may be chlorinated and/or chlorosulfonated polyolefins obtained by chlorination or chlorosulfonation of high polymeric hydrocarbons such as polyethylene, polypropylene, and their copolymers. These polyolefins may be prepared by any of the methods conveniently used for the chlorination of polyolefins, e.g., by chlorination or chlorosulfonation of the polymer in solution, in aqueous dispersion, or in dry form. The polyolefins are preferably uniformly chlorinated and preferably have weight average molecular weights of between aout 10,000 to 1,000,000 and more preferably between about 14,000 and 35,000. The chlorine content of the chlorinated polyolefin may vary within wide limits; in fact, polyolefins with chlorine contents as low as 10 percent may be used. On the other hand, chlorine contents above about 49 percent by weight fail to further improve the physical properties of the blend, and tend to cause problems in regard to compatibility.

The rubbery backbone material may also be an ethylene-vinyl acetate copolymer. These copolymers, which can be prepared by any conventional technique, should have average molecular weights of between 15,000 and 500,000 and more preferably from about 50,000 to 200,000. The ethylenevinyl acetate copolymers employed in the practice of the invention consist essentially of 15–85 percent by weight of combined ethylene and 85–15 percent by weight of combined vinyl acetate, with optimum physical properties being realized when the vinyl acetate content is between about 40 percent and 50 percent.

Finally, the rubbery backbone material may consist of polyethylene prepared by any conventional technique, preferably present in amounts of between 1–50 percent by weight.

Any of several techniques may be employed in chlorinating the graft blends described above. One extremely useful technique is that described in copending application Ser. No. 331,942, now U.S. Patent No. 3,328,371, filed Dec. 19, 1963. In utilizing this process, the graft blend is chlorinated in the presence of an acyl persulfonate having the structure

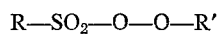

wherein R is a saturated hydrocarbon radical of from 5 to 18 carbon atoms and R' is an acyl radical having from 2 to 5 carbon atoms. In utilizing this technique, the graft blend is dispersed in a chlorinated hydrocarbon or the resin is prepared as an aqueous dispersion in the presence of a chlorinated hydrocarbon. The reaction is carried out at slightly elevated pressures, e.g., at from 1 to 20 p.s.i.g. and chlorine gas is fed at a controlled rate, thereby producing graft blends having a high chlorine content.

The chlorination of the graft blend may also be carried out in the presence of ultraviolet light. In chlorinating the graft blend by this process, an aqueous suspension of the graft copolymer is diluted with hydrochloric acid or water, chloroform is added as a swelling agent if desired, and the mixture is fed to a chlorinator, which may be a flooded tower with horizontal light wells spirally arranged. Chlorine gas is then fed at the bottom of the chlorinator.

The graft polyblend may also be chlorinated by a method involving the use of high temperatures and pressures.

According to this process, the resin is suspended in an aqueous medium containing up to about 25 percent by volume, based on a total liquid content of the aqueous medium of a chlorinated hydrocarbon swelling agent such as chloromethane, carbon tetrachloride, chloroform, etc. The reaction temperature is maintained at temperatures in the range of about 50° C. to 100° C. and the pressure is maintained in the range of from about 15 p.s.i.g. to about 100 p.s.i.g. No other catalyst is required under these conditions. Upon completion of the chlorination reaction, the polymer slurry is filtered, washed, and dried by any of several well known techniques.

The following examples are given to illustrate the invention and are not intended to be limitations thereof. Unless otherwise indicated, all quantities mentioned are on a part by weight basis.

EXAMPLE I

A solution of 10 parts chlorinated polyethylene (chlorine content=31.8%, specific viscosity in 0.42% cyclohexane solution=0.343) in 100 parts vinyl chloride monomer is charged to an air-evacuated pressure vessel containing 160 parts water, 0.30 part methyl cellulose (5.5–7.0 hydroxypropyl, 22–23% methoxy content, viscosity of 2% aqueous solution at 20° C.=100 cps.) and 0.26% lauroyl peroxide.

Polymerization is carried out under agitation at 50° C. for 16 hours. After venting of small quantities of unconverted monomer, 108 parts of a homogeneous, granular resin are obtained. The dry resin passes 100% through a 40 mesh screen and has a specific viscosity of 0.583. In a 2 liter glass reactor, shielded from light and equipped with agitator, condenser, gas-dip tube, and sampling device, 200 grams of the granular graft copolymer are dispersed in 800 ml. water in the presence of 70 grams of carbon tetrachloride and 0.20 gram of acetyl cyclohexane persulfonate (0.1% by weight of resin) at room temperature. After a nitrogen purge to remove oxygen from the reactor, chlorine gas in added through an immersed sparger at a flow rate of 2.45 ml./min./gram of resin.

After saturation of the reaction mixture with chlorine as indicated by amount and color of off-gas, the temperature is raised to 50° C. and kept there with the aid of a thermostatically controlled water bath under mild agitation (80 r.p.m.) of the reactor contents for three hours, or until the resin is sufficiently chlorinated. The swollen resin particles are separated from the solvent by filtration, washed with carbon tetrachloride, rewashed with methanol and dried.

EXAMPLE II

A graft polymer is prepared by charging a clean glass lined reactor having an agitator and fitted with adequate heat transfer means to remove the exothermic heat of polymerization, with 125 parts of purified water, 9.5 parts of 24 percent chlorine content chlorinated polyethylene with a number average molecular weight of 39,000, 0.9 part of epoxidized soybean oil type vinyl plasticizer, 0.2 part sorbitan monolaurate, and 0.15 part of hydroxypropyl methyl cellulose in solution in 20 parts of cool water. Air is evacuated from the reaction vessel. 90.5 parts of vinyl chloride monomer is charged to the reactor and the temperature is adjusted to 57° C. Thirty minutes later, 0.2 part of lauroyl peroxide is flushed into the reactor with water. After eight hours, the action is terminated by venting off the residual monomer. The aqueous resin slurry is washed and dewatered in a continuous solid bowl centrifuge and the volatile matter then reduced to less than 0.2 percent by passing the moist centrifuge cake through a rotary co-current hot air drier. 200 grams of the graft copolymer are dispersed in 800 ml. of carbon tetrachloride in a 2 liter reactor. After passing nitrogen through the reactor to remove oxygen, dry chlorine gas is added through a flowmeter at a rate of 3.50 ml./min./g. graft copolymer while the temperature is raised to 50° C. After saturation of the solvent with chlorine, 0.4 gram (0.0011 mole/liter) of acetyl methyl cyclohexane persulfonate are added. The temperature is maintained at 50° C. while chlorine gas is added at such a rate that the released hydrogen chloride is essentially free of it. The swollen resin particles are separated from the solvent by filtration, washed with carbon tetrachloride, rewashed with methanol and dried.

EXAMPLE III

Polymerization is carried out as in Example II, but with solutions of 2 and 40 parts of the same chlorinated polyethylene in 100 parts of vinyl chloride monomer. In both cases homogeneous resins of fine particle size are obtained. 10 parts of the graft copolymer in finely divided form are diluted with 60 parts of 26 percent hydrochloric acid to form an aqueous suspension and 15 parts of chloroform are added as a swelling agent. The mixture is fed through a heat exchanger into a flooded tower having horizontal light wells spirally arranged. Chlorine gas is added at the bottom of the flooded tower at a rate sufficient to maintain an excess at all times. The heat of reaction is removed by circulating the reaction mixture to a heat exchanger and a cooler. The temperature is maintained at 55° C. for 45 minutes. Hydrogen chloride formed during the chlorination process passes through a reflux condenser and is conveyed to a waste disposal unit. The chlorinated graft copolymer is separated from the acid liquid by centrifuging and washed with water and 5 percent sodium bicarbonate solution. The chlorinated graft copolymer containing about 10 percent water is then dried to less than 0.1 percent moisture.

EXAMPLE IV

Example III is repeated using solutions of 10 and 50 parts of an ethylene-vinyl acetate copolymer having a vinyl acetate content of about 37 percent and 75 percent, respectively, in place of the chlorinated polyethylene. In both cases, homogeneous resins of fine particle size are obtained. The resins are then chlorinated as follows:

10 parts of finely divided resin are charged to a reaction vessel containing about 70 parts of distilled water. The resultant slurry is then agitated and the system is purged with a stream of nitrogen for 15 minutes. The reactor is evacuated and 10 parts of carbon tetrachloride are added to the reactor. The reactor is brought to a temperature of 75° C., chlorine is admitted to the system until the system reaches a pressure of about 40 p.s.i. and the reaction is continued until the resins are sufficiently chlorinated. The chlorinated graft copolymer is filtered and washed thoroughly, slurried in methanol and vacuum dried at 60° C. for 12 hours.

EXAMPLE V

Polymerization is carried out as in Example I, but with solutions of 40 and 100 parts of polyethylene in 100 parts of vinyl chloride monomer respectively. In both cases, homogeneous resins of fine particle size are obtained. The graft copolymer is then chlorinated as in Example I using 150 and 250 grams of the graft copolymer in 800 ml. of carbon tetrachloride.

The chlorinated graft copolymer formed in accordance with the foregoing examples may be mixed with stabilizers, lubricants, processing aids, and the like, and extruded, cooled, and classified. Hardness, rigidity, dimensional stability, toughness, tensile strength, elongation and tear strength may readily be adjusted over the range associated with rigid, semi-rigid, and flexible thermoplastic materials by varying the proportions of the polymeric constituents and liquid plasticizers, if any.

Processing temperatures for the compositions herein described are such that no significant degradation occurs during the overall manufacturing operation.

Typical applications for the rigid chlorinated graft copolymers are those wherein a higher maximum operating temperature than that allowable using nonchlorinated graft copolymers is necessary or where good mechanical strength is required while transporting hot fluids. A typical application for these compositions would be in rigid piping, for example, or in ducts capable of spanning normal distances between building supports without sagging. These rigid chlorinated graft copolymers may also find uses in the appliance, automotive, and building industries where nonflammability or weather resistance are critical, but where conventional rigid polyvinyl chloride has been unusable because of insufficient heat resistance.

Typical applications for the flexible materials include wire and cable insulation wherein the maximum service temperature necessary is approximately 125° C.

Processing aids which may advantageously be incorporated include acrylate rubbers, styrene-acrylonitrile-butadiene terpolymers, styrene-methyl styrene acrylonitrile terpolymers, styrene-acrylonitrile copolymers, methyl methacrylate polymers, solid aromatic residues from petroleum cracking operations, and so forth.

Liquid plasticizers which are useful in certain of the compositions include cyclic phosphate esters such as tricresyl phosphate, phthalate esters such as di-2-ethyl benzyl and di-tridecyl phthalate, adipate esters such as di-n-octyl and n-octyl-n-decyl adipate, azelate esters such as di-2-ethyl benzyl azelate, sebacate esters such as di-2-ethyl hexyl sebacate, trimellitate esters, epoxidized soybean oil, epoxidized tall oil and epoxy stearate plasticizers, complex linear polyesters and polymeric plasticizers, certain citric, acetylcitric, tartaric and ricinoleic acid esters, certain glycol, glycerol and penta-erythritol esters of fatty acids, and so forth.

Other additives frequently required for optimizing the processing performance and/or end use of properties of the compositions include stabilizers, co-stabilizers, antioxidants, lubricants, coated and/or uncoated fillers, pigments and light screeners.

The particular combination of primary ingredients and additives in commercially useful compositions within the range of this invention depends on the specific combination of end use requirements and is varied from one application to another to achieve the optimum overall cost-performance ratio.

Obviously, many variations are possible other than the specific processing conditions described herein. For example, the quantity of catalyst used in chlorinating the resin may be varied between .01 to .5 percent by weight of the resin depending upon the temperature and the rate of chlorination desired. In addition, any of numerous chlorinated hydrocarbons may be used, for example, methylene chloride, chloroform, carbon tetrachloride, dichlorethane, tetrachloroethane, etc. The chlorinated hydrocarbon solvent may be present in amounts between 10 percent to 100 percent by weight of solvent based on resin weight. Pressures may vary between atmospheric pressure and 100 p.s.i.g. during chlorination of the resin depending upon whether a catalyst is used. Obviously, lower pressures can be used when chlorination is carried out in the presence of a catalyst. The reaction temperature may vary between 25° C. and 100° C. with optimum conversion rates being produced between 50° C. and 75° C.

The graft copolymers are most conveniently prepared by dissolving the rubbery backbone in the vinyl chloride monomer and then polymerizing the vinyl chloride. Suspension polymerization is the preferred procedure due to the ease of recovery and physical form of the resin obtained; however, polymerization may also be carried out in mass, solution, or emulsion. Temperatures ranging between 20–80° C. are operable with optimum yields being produced at between 45–65° C. The polymerization may be accelerated by heat, irradiation and polymerization catalysts. Catalysts which have been found to be useful are monomer-soluble organic peroxides, e.g., benzoyl peroxide, lauroyl peroxide, 2,4-dichlorobenzoyl peroxide, acetyl peroxide, acetyl benzoyl peroxide, or other unsymmetrical peroxides, t-butyl hydroperoxide, alkyl percarbonates, perborates, azo compounds, and mixtures of the same. The quantity of catalyst will generally be varied depending on initiator activity, and on the quantity of monomer and diluent. The polymerizations can also be advantageously carried out in the presence of chain regulators such as chlorinated hydrocarbons, alcohols, aldehydes, etc., although grafting efficiency is reduced by their presence. Suitable suspending agents that can be used in the practice of this invention are hydrophilic, macromolecular, natural or synthetic colloids an nonionic or ionic synthetic surfactants, and mixtures of the same.

While in the foregoing specification, specific compositions and steps have been set out in considerable detail for the purpose of illustrating the invention, it will be understood that such details of composition and procedure may be varied widely by those skilled in the art without departing from the spirit of this invention.

What is claimed is:

1. A chlorinated graft copolymer blend prepared by polymerizing 50–99 parts by weight of a monomeric material in the presence of 1–50 parts by weight of an elastomeric backbone material selected from the group consisting of chlorinated polyethylene, polyethylene, and an ethylene-vinyl acetate copolymer to produce grafting of at least a portion of the polymerizing monomeric material on the elastomeric backbone material to form a graft copolymer blend, and chlorinating the resultant graft copolymer blend; said monomeric material comprising 80–100 percent by weight of vinyl chloride and 20–0 percent by weight of other ethylenically unsaturated monomers copolymerizable therewith.

2. A chlorinated graft copolymer blend according to claim 1 wherein the elastomeric backbone material is chlorinated polyethylene having a chlorine content of between 10–49 percent by weight.

3. A chlorinated graft copolymer blend according to claim 1 wherein said elastomeric backbone material is polyethylene.

4. A chlorinated graft copolymer blend according to claim 1 wherein said elastomeric backbone material is an ethylene-vinyl acetate copolymer having a vinyl acetate content of 15–85 percent by weight.

5. A chlorinated graft copolymer blend according to claim 1 wherein said graft copolymer blend is chlorinated in the presence of an acyl persulfonate having the structure:

$$R-SO_2-O-O-R'$$

wherein R is a saturated hydrocarbon radical of from 5 to 18 carbon atoms and R' is an acyl radical having from 2 to 5 carbon atoms.

6. A chlorinated graft copolymer blend according to claim 5 wherein said acyl persulfonate is acetyl cyclohexane persulfonate.

7. A chlorinated graft copolymer blend according to claim 1 wherein the graft copolymer is chlorinated in the presence of a chlorinated hydrocarbon swelling agent at a temperature of between 50° C. to 100° C. and at a pressure of between 15 p.s.i.g. to 100 p.s.i.g.

8. A chlorinated graft copolymer blend according to claim 1 wherein the graft copolymer blend is chlorinated as an aqueous suspension in the presence of ultraviolet light.

References Cited

UNITED STATES PATENTS

| | | | |
|---|---|---|---|
| 2,996,489 | 8/1961 | Dannis et al. | 260—92.8 |
| 3,328,371 | 6/1967 | Beer | 260—87.5 |
| 3,358,054 | 12/1967 | Hardt et al. | 260—878 |
| 3,167,535 | 1/1965 | Gateff et al. | 204—159.18 |
| 3,177,270 | 4/1965 | Jones et al. | 260—878 |
| 2,733,228 | 1/1956 | Salyer et al. | 260—878 |
| 3,268,623 | 8/1966 | Beer | 260—876 |
| 2,947,719 | 8/1960 | Rugg et al. | 260—878 |

OTHER REFERENCES

Annalen des Chemie, vol. 578, pp. 50–64, 1952.

MURRAY TILLMAN, Primary Examiner

J. T. GOOLKASIAN, Assistant Examiner

U.S. Cl. X.R.

204—159.17, 159.18; 260—92.8, 96

PO-1050 (5/69)

UNITED STATES PATENT OFFICE
CERTIFICATE OF CORRECTION

Patent No. 3,487,129                              Dated  December 30, 1969

Inventor(s)  Norbert Platzer

It is certified that error appears in the above-identified patent and that said Letters Patent are hereby corrected as shown below:

Column 3, line 2, the figure "1000,000" should read ---100,000---.

SIGNED AND SEALED
JUN 9 1970

(SEAL)
Attest:

Edward M. Fletcher, Jr.
Attesting Officer

WILLIAM E. SCHUYLER, JR.
Commissioner of Patents